United States Patent
Yamada et al.

(10) Patent No.: US 8,669,734 B2
(45) Date of Patent: Mar. 11, 2014

(54) CONTROL DEVICE AND CONTROL METHOD FOR MOTOR

(75) Inventors: Kenji Yamada, Komaki (JP); Yasuhiro Nakai, Kariya (JP); Satoru Katoh, Nisshin (JP); Yoshihiro Shamoto, Toyota (JP); Takaya Soma, Anjyo (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 359 days.

(21) Appl. No.: 13/183,501

(22) Filed: Jul. 15, 2011

(65) Prior Publication Data

US 2012/0019179 A1    Jan. 26, 2012

(30) Foreign Application Priority Data

Jul. 20, 2010    (JP) .................. 2010-163103

(51) Int. Cl.
*G05B 1/06* (2006.01)

(52) U.S. Cl.
USPC .......................... 318/661; 318/461

(58) Field of Classification Search
USPC .................. 318/661, 461, 362, 376
See application file for complete search history.

(56) References Cited

U.S. PATENT DOCUMENTS

| 4,429,267 A * | 1/1984 | Veale | 318/594 |
| 5,189,353 A * | 2/1993 | Ezuka | 318/605 |
| 6,713,981 B2 * | 3/2004 | Nakajima | 318/491 |
| 2004/0150359 A1 | 8/2004 | Yaguchi et al. | |
| 2006/0201238 A1 * | 9/2006 | Trapasso et al. | 73/117.3 |
| 2008/0196955 A1 | 8/2008 | Minamikawa | |
| 2009/0167296 A1 * | 7/2009 | Yokokawa | 324/207.25 |

FOREIGN PATENT DOCUMENTS

| JP | 2001-082981 A | 3/2001 |
| JP | 2001-165707 A | 6/2001 |
| JP | 2001-215234 A | 8/2001 |
| JP | 2004061157 A | 2/2004 |
| JP | 2004222448 A | 8/2004 |
| JP | 2007-185071 A | 7/2007 |
| JP | 2008-089409 A | 4/2008 |
| JP | 2008-195316 A | 8/2008 |
| JP | 2009-156852 A | 7/2009 |

* cited by examiner

*Primary Examiner* — Rina Duda
(74) *Attorney, Agent, or Firm* — Gifford, Krass, Sprinkle, Anderson & Citkowski, P.C.

(57) ABSTRACT

A control device divides 360° corresponding to one cycle of a resolver angle into N zones, and determines whether or not a resolver angle θ in the current cycle exceeds a division border. When determined that resolver angle θ in the current cycle exceeds a division border, the control device calculates a time difference ΔT[n] between a calculation time T[n] in the immediately preceding resolver cycle and a calculation time T in the current cycle. The control device also calculates a resolver angle variation Δθ[n] with time difference ΔT[n] by adding 360° to the difference between resolver angle θ obtained in the current cycle and a resolver angle θ[n] obtained in the immediately preceding resolver cycle. The control device then calculates a rotation speed NM by multiplying, by a coefficient K, a value obtained by dividing Δθ[n] by ΔT[n].

11 Claims, 14 Drawing Sheets

CONTROL DEVICE AND CONTROL METHOD FOR MOTOR

CROSS-REFERENCE TO RELATED APPLICATION

This nonprovisional application claims priority to Japanese Patent Application No. 2010-163103 filed on Jul. 20, 2010 with the Japan Patent Office, the entire contents of which are hereby incorporated by reference.

BACKGROUND OF THE INVENTION

1. Field of the Invention

The present invention relates to a technique of controlling a motor using a resolver output.

2. Description of the Background Art

A technique of calculating a motor rotation speed using a resolver and controlling the motor based on the calculated rotation speed is known. Generally, a resolver output contains an error. To eliminate an influence of this error, various techniques of correcting for a detected angle of the resolver have conventionally been proposed.

For example, Japanese Patent Laying-Open No. 2004-222448 discloses a technique of measuring time periods T1 to T12 until the detected angle of a resolver becomes 60°, 120°, . . . and 720°, respectively, calculating a shift angle $\Delta\theta n$ every 60° using measured time periods T1 to T12, and substituting calculated shift angle $\Delta\theta n$ into the expression $\theta n = n \times 60° + \Delta\theta n$ (n=1 to 11), thereby performing angle correction every 60°. It is described that this technique can drive a motor while preventing a control failure even if the detected angle of the resolver contains an error.

It is known that a resolver output contains an error synchronized with rotation of a rotor. A technique for eliminating this error includes a technique of calculating the rotation speed of the motor based on the result of measuring a time period in which a resolver output completes one cycle (resolver cycle).

There is another technique of dividing 360° corresponding to one cycle of a resolver output into a plurality of sections, and measuring the resolver cycle every time the detected angle of the resolver exceeds each division border, thereby calculating the rotation speed. With this technique, the calculation cycle of the rotation speed can be made shorter than the resolver cycle, so that the rotation speed can be calculated with accuracy even at low motor rotation speeds. However, in the case where determination about division border exceeding is implemented via software, the division border exceeding cannot be measured correctly in such a long calculation cycle of performing at least one calculation per division border, resulting in degraded calculation accuracy of the rotation speed.

SUMMARY OF THE INVENTION

The present invention was made to solve the above-described problems, and has an object to calculate the motor rotation speed with accuracy based on a resolver output even at a relatively long calculation cycle.

A control device in accordance with the present invention is a control device for a motor, including a resolver detecting a rotation angle of the motor, and a control unit controlling the motor based on an output of the resolver. The control unit divides an angle corresponding to one cycle of the output of the resolver into a plurality of sections, and determines whether or not a detected angle of the resolver exceeds any border among the plurality of sections at each predetermined calculation cycle, calculates an angle variation from a first time point when border exceeding of the detected angle is determined to a second time point when the border exceeding is determined after one cycle, calculates a rotation speed of the motor based on a value obtained by dividing the angle variation from the first time point to the second time point by a time period between the first and second time points, and controls the motor based on the rotation speed.

Preferably, the control unit stores a time and the detected angle when the border exceeding is determined every time the border exceeding is determined, calculates the angle variation from the first time point to the second time point by adding a difference in the detected angle between the first and second time points to the angle corresponding to the one cycle, and calculates a time difference between the first and second time points as the time period between the first and second time points.

Preferably, the control unit, every time the border exceeding is determined, stores a sectional time difference and a sectional angular difference in the detected angle between a time when the border exceeding is determined and a time when the border exceeding is determined in an immediately preceding section, calculates a total value of the sectional angular differences of the plurality of sections as the angle variation from the first time point to the second time point, and calculates a total value of the sectional time differences of the plurality of sections as the time period between the first and second time points.

Preferably, the control unit limits the time period between the first and second time points to a predetermined upper limit time.

Preferably, the control unit changes the number of divisions of the angle corresponding to the one cycle depending on the rotation speed. Preferably, the control unit increases the number of divisions as the rotation speed is lower.

Preferably, assuming that a multiplication factor of angle of the resolver is a, the number of pairs of poles of the motor is b, a speed of the motor per minute is c, the number of calculations per second is f, and a value at which a memory storing information for calculating the rotation speed overflows is Tr, the control unit changes the number of divisions in a range of values larger than $60 \times a/(b \times c \times Tr)$ and smaller than $(60 \times a \times f)/(b \times c)$.

Preferably, the control unit predicts the rotation speed at a third time point succeeding a time point when the rotation speed is calculated, based on a history of the rotation speed preceding the time point when the rotation speed is calculated.

Preferably, when predicting the rotation speed, the control unit extends a time difference between the time point when the rotation speed is calculated and the third time point as the rotation speed is lower.

A control method in accordance with another aspect of the present invention is a control method performed by a control device for a motor. A resolver detecting a rotation angle of the motor is connected to the control device. The control method includes the steps of dividing an angle corresponding to one cycle of the output of the resolver into a plurality of sections, and determining whether or not a detected angle of the resolver exceeds any border among the plurality of sections at each predetermined calculation cycle, calculating an angle variation from a first time point when border exceeding of the detected angle is determined to a second time point when the border exceeding is determined after one cycle, calculating a rotation speed of the motor based on a value obtained by dividing the angle variation from the first time point to the second time point by a time period between the first and second time points, and controlling the motor based on the rotation speed.

Therefore, a principal advantage of the present invention is that the motor rotation speed can be calculated with accuracy based on a resolver output even at a relatively long calculation cycle.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
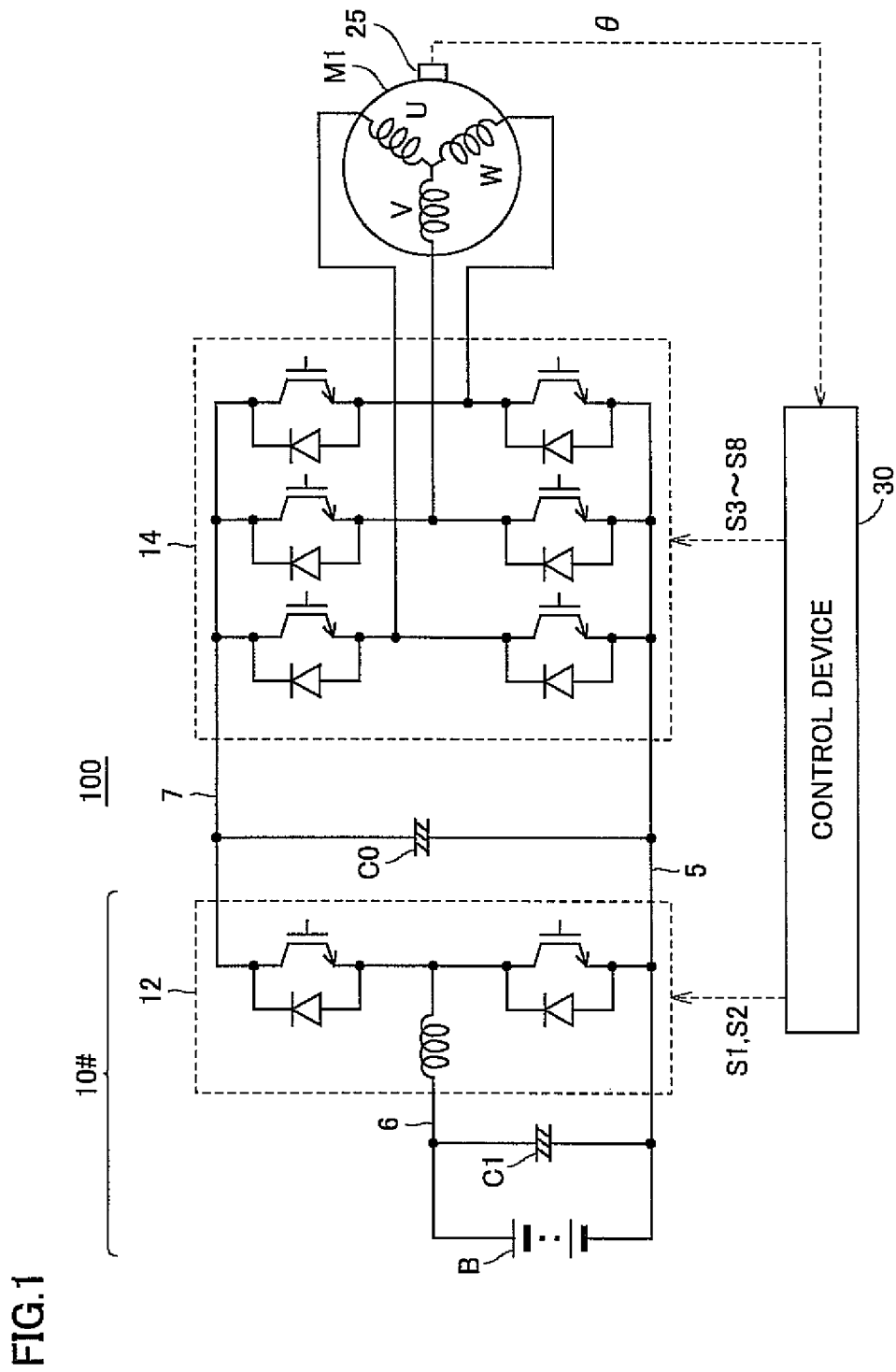
FIG. 1 is an overall structural diagram of a motor drive control system.

Hereinafter, embodiments of the present invention will be described in detail with reference to the drawings. It should be noted that identical or relevant portions in the drawings shall be denoted by identical reference characters, and description thereof will not be repeated in principle.

First Embodiment

FIG. 1 is an overall structural diagram of a motor drive control system 100 to which a control device in accordance with the first embodiment of the present invention is applied.

With reference to FIG. 1, motor drive control system 100 includes a DC voltage generation unit 10#, a smoothing capacitor C0, an inverter 14, a motor M1, and a control device 30.

DC voltage generation unit 10# includes a DC power supply B, a smoothing capacitor C1, and a converter 12.

DC power supply B is typically implemented by a nickel-metal hydride, lithium ion, or similar secondary battery, or a power storage device such as an electric double layer capacitor.

Converter 12 includes a reactor, two switching elements, and two diodes. The two switching elements of converter 12 are controlled by control signals S1 and S2 from control device 30, respectively. In a step-up operation, converter 12 steps up a voltage across a positive electrode line 6 and a negative electrode line 5 (a voltage across DC power supply B), and outputs the stepped-up voltage across a positive electrode line 7 and negative electrode line 5. In a step-down operation, converter 12 steps down a voltage across positive electrode line 7 and negative electrode line 5, and outputs the stepped-down voltage across positive electrode line 6 and negative electrode line 5.

Smoothing capacitor C0 smoothes a DC voltage from converter 12, and supplies the smoothed DC voltage to inverter 14.

Inverter 14 includes upper and lower arms (switching elements) of three phases (U, V, and W phases) provided in parallel across positive electrode line 7 and negative electrode line 5. Turning on/off of the upper and lower arms of the respective phases is controlled by control signals S3 to S8 from control device 30. Inverter 14 converts DC power supplied from converter 12 into AC power for supply to motor M1. Converter 12 converts regenerative power (AC power) generated by motor M1 into DC power for supply to converter 12.

Motor M1 is a motor for traveling, for example, for generating torque for driving driven wheels of an electrically driven vehicle (which shall represent a vehicle generating a vehicle driving force with electric energy, such as a hybrid vehicle, an electric vehicle, and a fuel-cell vehicle). Motor M1 is configured to function both as a motor and a generator. Typically, motor M1 is a permanent-magnet type three-phase synchronous motor, with one ends of three coils of U, V, and W phases being connected in common to a neutral point. The other end of each phase coil is connected to an intermediate point of the upper and lower arms of each phase of inverter 14.

Motor drive control system 100 further includes a resolver 25. Resolver 25 includes a stator and a rotor attached to a rotation shaft of motor M1, and detects a rotation angle of the rotor to output the detection result to control device 30 as a resolver angle θ. Resolver 25 may be configured as is well known. Assuming that a multiplication factor of angle of resolver 25 is a (a is a natural number), resolver 25 outputs, a times, resolver angle θ whose phase varies 360° while the rotor makes one turn. In other words, the phase of resolver angle θ varies 360° while motor M1 makes a 1/a turn. The "resolver cycle" used in the following description shall refer to a time period in which resolver angle θ completes one cycle (varies 360°). The present invention is applicable to a resolver of any multiplication factor of angle.

Control device 30 is implemented by an ECU (Electronic Control Unit) including a CPU (Central Processing Unit) and a memory not shown, and controls the operation of motor drive control system 100 based on data stored in the memory.

It is known that resolver angle θ output from resolver 25 contains an error component synchronized with rotation of the rotor. Therefore, a relatively great error may exist between resolver angle θ and an actual rotation angle of the rotor depending on timing of obtaining resolver angle θ.

Particularly at lower speeds (when the motor rotation speed is lower than a predetermined value), an error in resolver angle θ is likely to increase since the resolver cycle is longer and the rotation energy of motor M1 relatively decreases, so that the influence of a disturbance increases.

In view of such problems, control device 30 calculates a plurality of types of rotation speeds of motor M1 based on resolver angle θ, and uses these rotation speeds properly depending on the operation status and use of motor M1.

Figure 2:
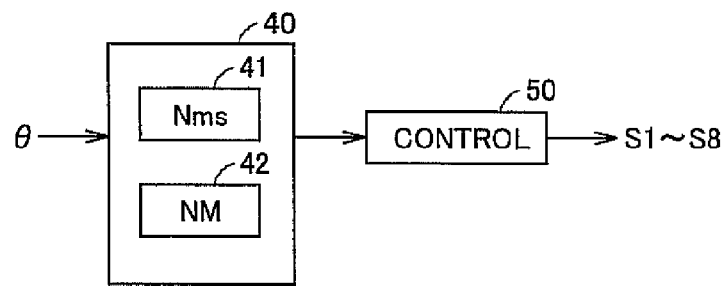
FIG. 2 is a (first) functional block diagram of a control device.

FIG. 2 is a functional block diagram of control device 30. Each functional block shown in FIG. 2 may be implemented via hardware or software.

Control device 30 includes a calculation unit 40 and a control unit 50. Calculation unit 40 calculates a plurality of types of motor rotation speeds based on resolver angle θ received from resolver 25. Calculation unit 40 includes a calculation unit 41 calculating a rotation speed Nms and a calculation unit 42 calculating a rotation speed NM.

Calculation unit 41 measures a variation of resolver angle θ per ms, and calculates rotation speed Nms by converting the measured variation into a motor rotation speed. Calculation unit 41 also calculates, every 2 ms, an average rotation speed of the past two rotation speeds Nms. To eliminate the influence of an error superimposed on rotation speed Nms, calculation unit 41 calculates, every 2.5 ms, a rotation speed obtained by subjecting a plurality of past rotation speeds Nms to first-order lag processing.

Calculation unit 42 measures a variation of resolver angle θ corresponding to one resolver cycle, and converts the measured variation into a motor rotation speed to calculate rotation speed NM. Rotation speed NM, calculated from the variation of resolver angle θ corresponding to one resolver cycle, is a value less susceptible to a resolver error.

In this manner, calculation unit 40 calculates the four types of rotation speeds in total: rotation speed Nms; the average rotation speed of rotation speeds Nms; the rotation speed obtained by subjecting rotation speeds Nms to first-order lag processing; and rotation speed NM. It should be noted that the rotation speeds calculated by calculation unit 40 are not limited to these.

Control unit 50 generates control signals S1 to S8 for bringing a rotation speed calculated by calculation unit 40 close to a target rotation speed for output to converter 12 and inverter 14. At this stage, control unit 50 determines which one of the above-mentioned four rotation speeds is used to generate control signals S1 to S8 depending on the operation status and use of motor M1.

The present embodiment is characterized by the technique of calculating rotation speed NM by calculation unit 42. This point will now be described in detail.

Calculation unit 42 divides the angle of 360° corresponding to one resolver cycle into N sections (hereinafter referred to as "zones") (N is a natural number more than or equal to 2), and determines whether or not resolver angle θ exceeds each division border. When determined that resolver angle θ exceeds a division border, calculation unit 42 stores and holds a time T and resolver angle θ at that time in a memory as a division-border exceeding time and a resolver angle of the current cycle, respectively.

Every time calculation unit 42 determines that resolver angle θ exceeds a division border, calculation unit 42 calculates rotation speed NM based on the division-border exceeding time and the resolver angle stored and held in the memory in the immediately preceding resolver cycle, and based on division-border exceeding time T and resolver angle θ of the current cycle. In this manner, dividing the angle of 360° corresponding to one resolver cycle into N sections to make the calculation cycle of rotation speed NM shorter than the resolver cycle (i.e., increasing the number of calculations of rotation speed NM in one resolver cycle to N times more than once) enables accurate calculation of rotation speed NM even at low motor rotation speeds.

An improvement in determination accuracy of division border exceeding will result in correct measurement of a time period in which resolver angle θ varies 360° (i.e., the resolver cycle), which can improve the calculation accuracy of rotation speed NM. A technique of improving the determination accuracy of division border exceeding can be implemented either via hardware or software. However, for implementation simply via software, the calculation cycle needs to be very short, which is not practical. For example, assuming that a multiplication factor of angle of the resolver is 2, the number of pairs of poles of the motor is 4, and a motor rotation speed is 10000 rpm, the calculation cycle needs to be less than or equal to 1 μs. In contrast, implementation via hardware is technically relatively easy, but may lead to cost increase.

Therefore, control device 30 in accordance with the present embodiment executes control that can minimize degradation in calculation accuracy of rotation speed NM even at a relatively long calculation cycle of calculating at least once per division border, in a mode that can be implemented via software. The present embodiment is characterized by this point.

Figure 3:
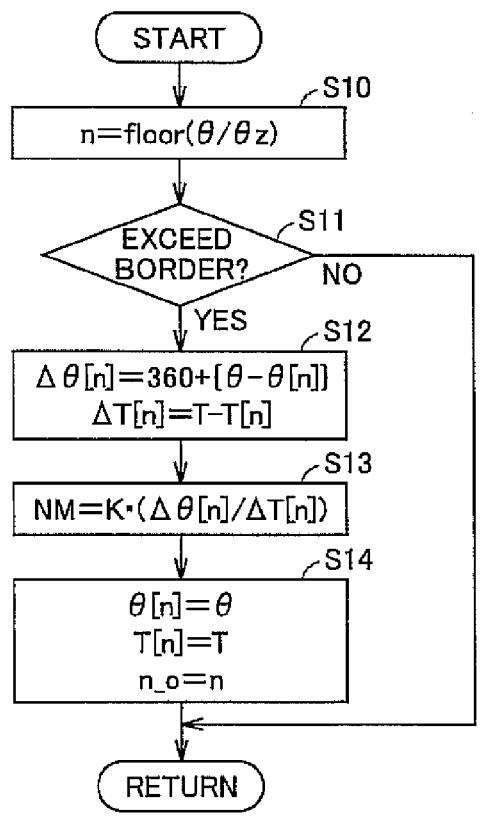
FIG. 3 is a (first) flow chart showing a procedure of the control device.

FIG. 3 is a flow chart showing a procedure of control device 30 when calculating rotation speed NM. The flow chart shown in FIG. 3 is repeatedly performed at a relatively long calculation cycle (e.g., 2.5 ms) of calculating at least once per division border. It should be noted that each step (hereinafter abbreviated to "S") can be implemented via hardware as described above, but is desirably implemented via software from the viewpoint of reducing cost increase.

At S10, control device 30 calculates a zone number n of the current cycle. Zone number n is a value indicating to which zone among the above-described N zones resolver angle θ belongs. Control device 30 calculates zone number n based on the following Expression (1):

$$n = \text{floor}(\theta/\theta z) \qquad (1)$$

Herein, "floor (θ/θz)" is a function indicating a value obtained by rounding down decimal fractions of the value of θ/θ z. A resolver angle per zone is denoted by "θz". For example, when the number of divisions N=10, θz is 360/10=36°. Assuming that resolver angle θ at calculation time T in the current cycle is 260°, zone number n=floor (260/36)=floor (7.22 . . . )=7. Zone number n is an integer varying from "0" to "N−1" in one resolver cycle.

At S11, control device 30 determines whether or not resolver angle θ exceeds a division border. When zone number n in the current cycle is not equal to a zone number n_o in the preceding cycle (when n≠n_o), control device 30 determines that resolver angle θ exceeds a division border. When resolver angle θ does not exceed a division border (NO at S11), control device 30 terminates the process. When resolver angle θ exceeds each division border (YES at S11), control device 30 advances the process to S12.

At S12, control device 30 calculates a time difference ΔT[n] between a calculation time T[n] in the n-th zone of the immediately preceding resolver cycle and calculation time T in the current cycle using the following Expression (2), and calculates a resolver angle variation Δθ[n] from T[n] to T using the following Expression (3):

$$\Delta T[n] = T - T[n] \qquad (2)$$

$$\Delta\theta[n] = 360 + \{\theta - \theta[n]\} \qquad (3)$$

Herein, θ[n] is a resolver angle obtained at calculation time T[n] in the n-th zone of the immediately preceding resolver cycle. Specifically, control device 30 calculates resolver angle variation Δθ[n] with time difference ΔT[n] by adding 360° to the difference between resolver angle θ obtained in the current cycle and a resolver angle θ[n] obtained in the immediately preceding resolver cycle.

At S13, control device 30 calculates rotation speed NM using the following Expression (4):

$$NM=K\cdot(\Delta\theta[n]/\Delta T[n]) \qquad (4)$$

Herein, "Δθ[n]/ΔT[n]" is a rate of variation of resolver angle θ with time difference ΔT[n], and "K" is a coefficient for converting the rate of variation into a motor rotation speed (in rpm). In the present embodiment, K=(2π/360)×(1/60).

At S14, control device 30 stores (holds) θ, T, and n obtained or calculated in the current cycle in the memory as θ[n], T[n], and n_o, respectively, for use in subsequent calculations.

Figure 4:
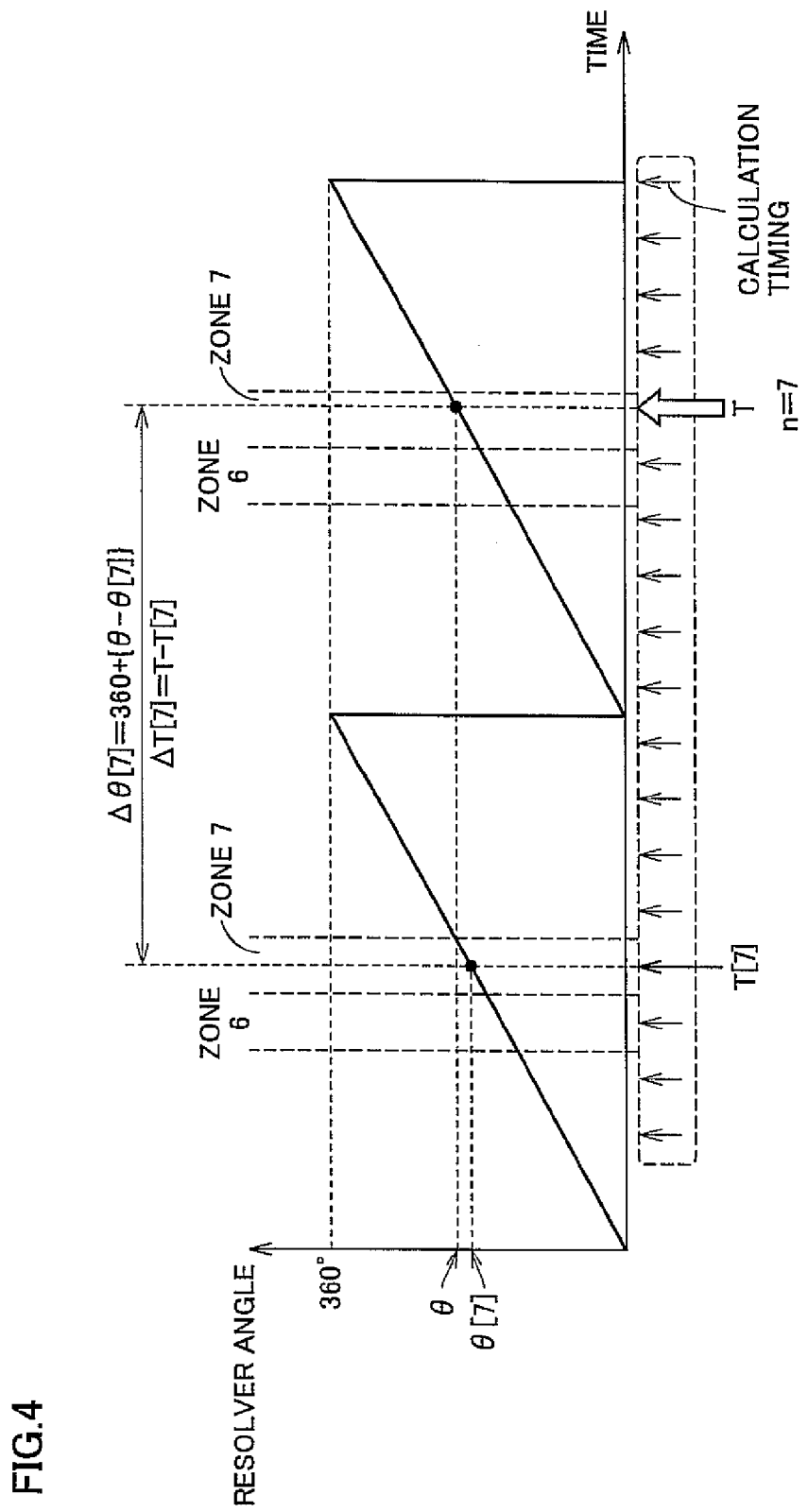
FIG. 4 is a (first) diagram showing a calculation method of a rotation speed NM.

FIG. 4 is a diagram showing a technique of calculating rotation speed NM in the present embodiment. It should be noted that FIG. 4 illustrates a case where zone number n at calculation time T in the current cycle is "7".

When zone number n at calculation time T in the current cycle is "7", control device 30 calculates a time difference ΔT[7] (=T−T[7]) between a calculation time T[7] in the seventh zone of the immediately preceding resolver cycle and calculation time T in the current cycle, as shown in FIG. 4.

Then, control device 30 calculates a resolver angle variation Δθ[7] from time T[7] to time T by adding the difference between resolver angle θ at time T and resolver angle θ[7] at time T[7] to the angle of 360° corresponding to one resolver cycle. Then, control device 30 calculates rotation speed NM in the current cycle by multiplying, by coefficient K, a value obtained by dividing resolver angle variation Δθ[7] by time difference ΔT[7].

The present embodiment is characterized particularly in that resolver angle variation Δθ[n] from time T[n] to time T is not 360°, but a value obtained by adding the difference between θ and θ[n] to 360° (in the example shown in FIG. 4, Δθ[7] is not 360°, but 360°+{θ−θ[7]}).

Specifically, since control device 30 in accordance with the present embodiment, which determines whether or not resolver angle θ exceeds each division border at each relatively long calculation cycle (every 2.5 ms), cannot determine correctly the time when resolver angle θ actually exceeds each division border. Therefore, a deviation occurs between an actual division-border exceeding time and the time when control device 30 determines the division border exceeding. That is, resolver angle variation Δθ[n] from time T[n] in the n-th zone of the immediately preceding resolver cycle to time T in the n-th zone of the current cycle is not 360°, but a value slightly deviated from 360°.

In order to correct for this deviation, control device 30 sets resolver angle variation Δθ[n] at a value obtained by adding the difference between θ and θ[n] to 360°, rather than 360°. Resolver angle variation Δθ[n] from time T[n] to time T can thereby be calculated with accuracy, so that the calculation accuracy of rotation speed NM can be improved.

As described above, control device 30 in accordance with the present embodiment determines whether or not resolver angle θ exceeds each division border at each relatively long calculation cycle. Therefore, a time period from the division-border exceeding time in the immediately preceding resolver cycle to the division-border exceeding time in the current cycle does not correctly match one resolver cycle. Taking this point into consideration, control device 30 corrects the resolver angle variation in a time period from the division-border exceeding time in the immediately preceding resolver cycle to the division-border exceeding time in the current cycle to a value obtained by adding the difference in resolver angle between the immediately preceding resolver cycle and the current cycle to 360°, rather than 360°, thereby calculating rotation speed NM. Rotation speed NM can thereby be calculated with accuracy based on resolver angle θ even at a relatively long calculation cycle.

First Variation of First Embodiment

The above first embodiment has described the case where the time and the resolver angle when the division border exceeding is determined are held.

In contrast, in this variation, a time difference between the calculation time in the current cycle and the calculation time in the immediately preceding zone and a difference between the resolver angle in the current cycle and the resolver angle in the immediately preceding zone are held, instead of holding the time and the resolver angle when the division border exceeding is determined.

Figure 5:
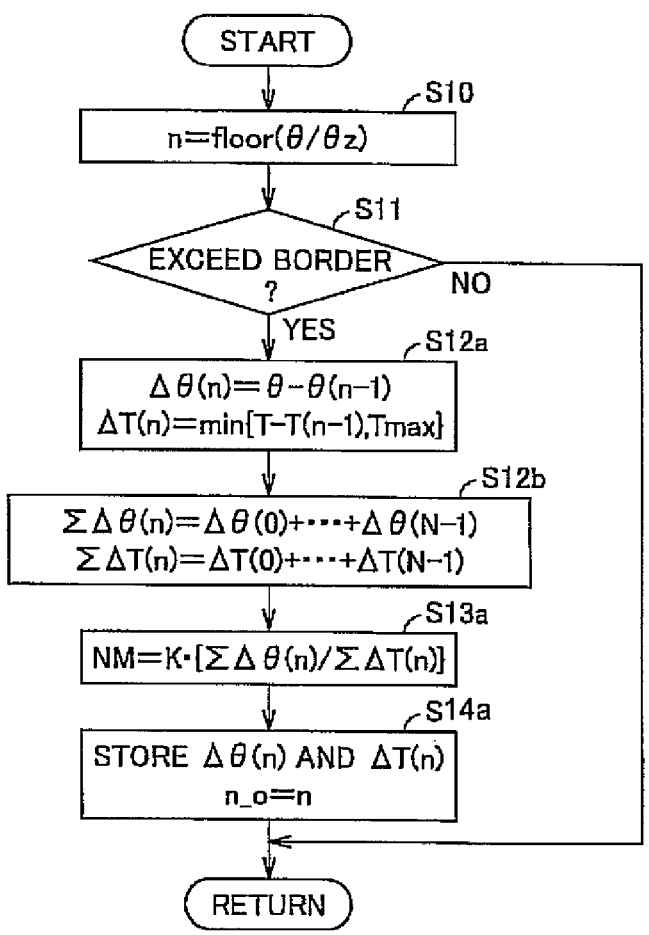
FIG. 5 is a (second) flow chart showing a procedure of the control device.

FIG. 5 is a flow chart showing a procedure of control device 30 in accordance with this variation. It should be noted that steps shown in FIG. 5 denoted by identical numbers as those shown in FIG. 3 have already been described, and detailed description thereof will thus not be repeated here.

When it is determined that resolver angle θ exceeds a division border (YES at S11), control device 30 calculates, at S12a, a time difference ΔT(n) between a calculation time T(n−1) in the immediately preceding zone and calculation time T in the current cycle using the following Expression (2a), and calculates a resolver angle variation Δθ(n) from a calculation time T(n) in the immediately preceding zone to calculation time T in the current cycle using the following Expression (3a):

$$\Delta T(n)=\min\{T-T(n-1),T\max\} \qquad (2a)$$

$$\Delta\theta(n)=\theta-\theta(n-1) \qquad (3a)$$

Herein, "min{T−T(n−1), Tmax}" represents a smaller one of T−T(n−1) and an upper limit time Tmax. The resolver angle at calculation time T(n−1) in the immediately preceding zone is denoted by "θ(n−1)". Specifically, control device 30 calculates the difference between resolver angle θ at calculation time T in the current cycle and resolver angle θ(n) at calculation time T(n) in the immediately preceding zone as resolver angle variation Δθ(n) with time difference ΔT(n).

At S12b, control device 30 calculates a time-difference total value ΣΔT(n) using the following Expression (2b), and calculates a resolver-angle-variation total value ΣΔθ(n) using the following Expression (3b):

$$\Sigma\Delta T(n)=\Delta T(0)+\Delta T(1)++\Delta T(N-1) \qquad (2b)$$

$$\Sigma\Delta\theta(n)=\Delta\theta(0)+\Delta\theta(1)+\ldots+\Delta\theta(N-1) \qquad (3b)$$

Specifically, control device 30 calculates the total value of the latest N time differences ΔT as a period corresponding to one resolver cycle, and calculates the total value of the latest N resolver angle variations Δθ(n) as a resolver angle variation in the period corresponding to one resolver cycle.

At S13a, control device 30 calculates rotation speed NM using the following Expression (4a):

$$NM=K\cdot(\Sigma\Delta\theta(n)/\Sigma\Delta T(n)) \qquad (4a)$$

At S14a, control device 30 stores Δθ(n) and ΔT(n) calculated in the current cycle in the memory for use in subsequent calculations, and stores (holds) n calculated in the current cycle in the memory as n_o for use in subsequent calculations.

Figure 6:
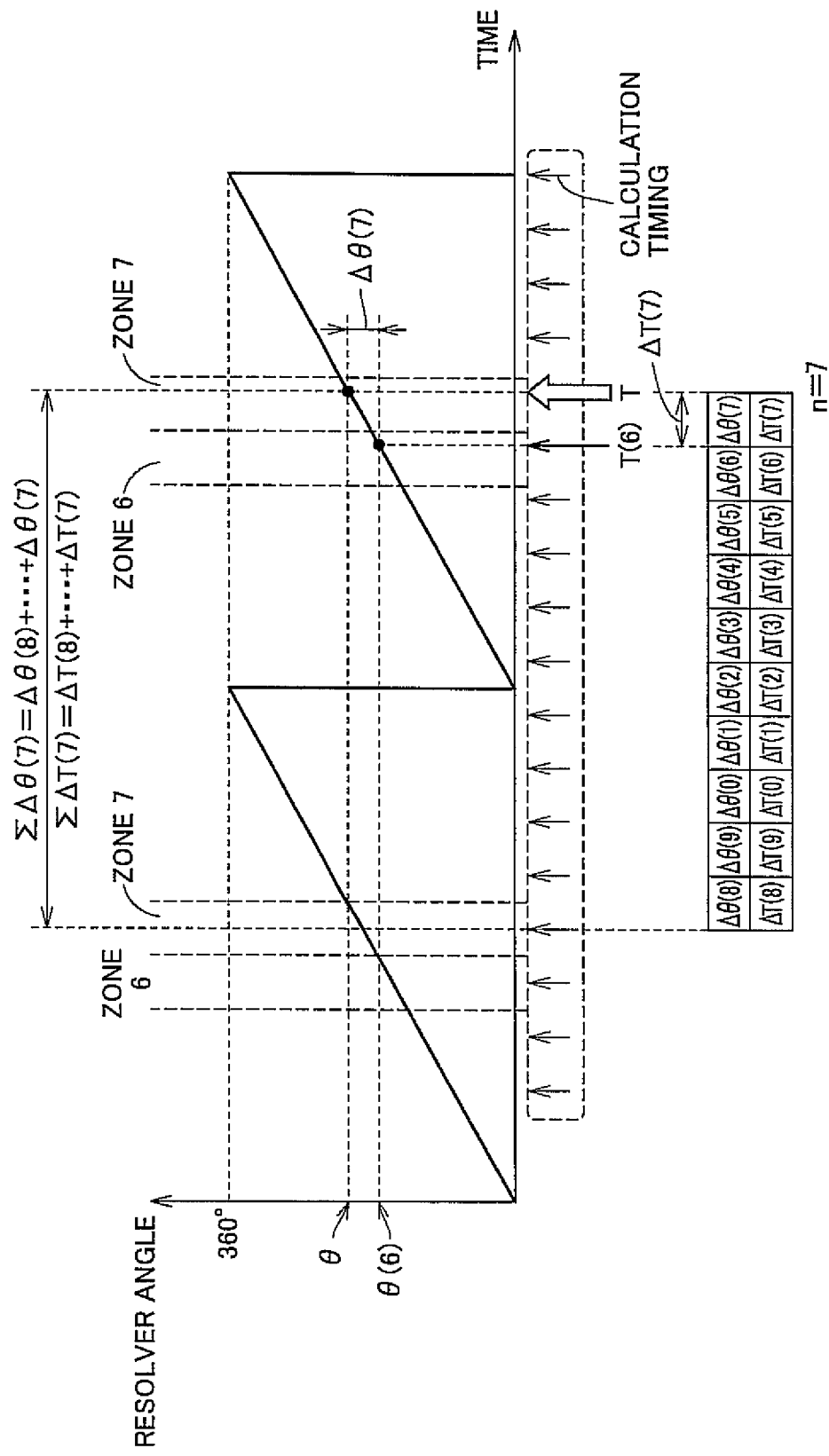
FIG. 6 is a (second) diagram showing a calculation method of rotation speed NM.

FIG. 6 is a diagram showing a technique of calculating rotation speed NM in this variation. It should be noted that FIG. 6 also illustrates the case where zone number n at calculation time T in the current cycle is "7", similarly to FIG. 4 described above.

In this variation, every time it is determined that resolver angle θ exceeds a division border, time difference ΔT(n) and resolver angle variation Δθ(n) from the immediately preceding zone are calculated and stored in the memory. For example, when zone number n in the current cycle is "7", time difference ΔT(7) in zone 7 is T−T(6), and resolver angle variation Δθ(7) in zone 7 is θ−θ(6), as shown in FIG. 6.

Then, control device 30 calculates time-difference total value ΣΔT (the total value of the latest N time differences ΔT) as a period corresponding to one resolver cycle. Control device 30 also calculates resolver-angle-variation total value ΣΔθ (the total value of the latest N resolver angle variations Δθ) as a resolver angle variation in the period corresponding to one resolver cycle. When zone number n in the current cycle is "7", ΣΔT(7)=ΔT(8)+ΔT(9)+ΔT(0)+ΔT(1)++ΔT(7), and ΣΔθ(7)=Δθ(8)+Δθ(9)+Δθ(0)+Δθ(1)+ . . . Δθ(7), as shown in FIG. 6.

Then, control device 30 calculates rotation speed NM in the current cycle by multiplying, by coefficient K, a value obtained by dividing resolver-angle-variation total value ΣΔθ by time-difference total value ΣΔT.

Rotation speed NM can thereby be calculated with accuracy based on resolver angle θ even at a relatively long calculation cycle, similarly to the first embodiment. Further, holding differences among zones can prevent the memory from overflowing even at low speeds.

Second Variation of First Embodiment

The number of divisions N is a fixed number in the above-described first embodiment and the first variation thereof. In contrast, in this variation, the number of divisions N is changed depending on the motor rotation speed.

Figure 7:
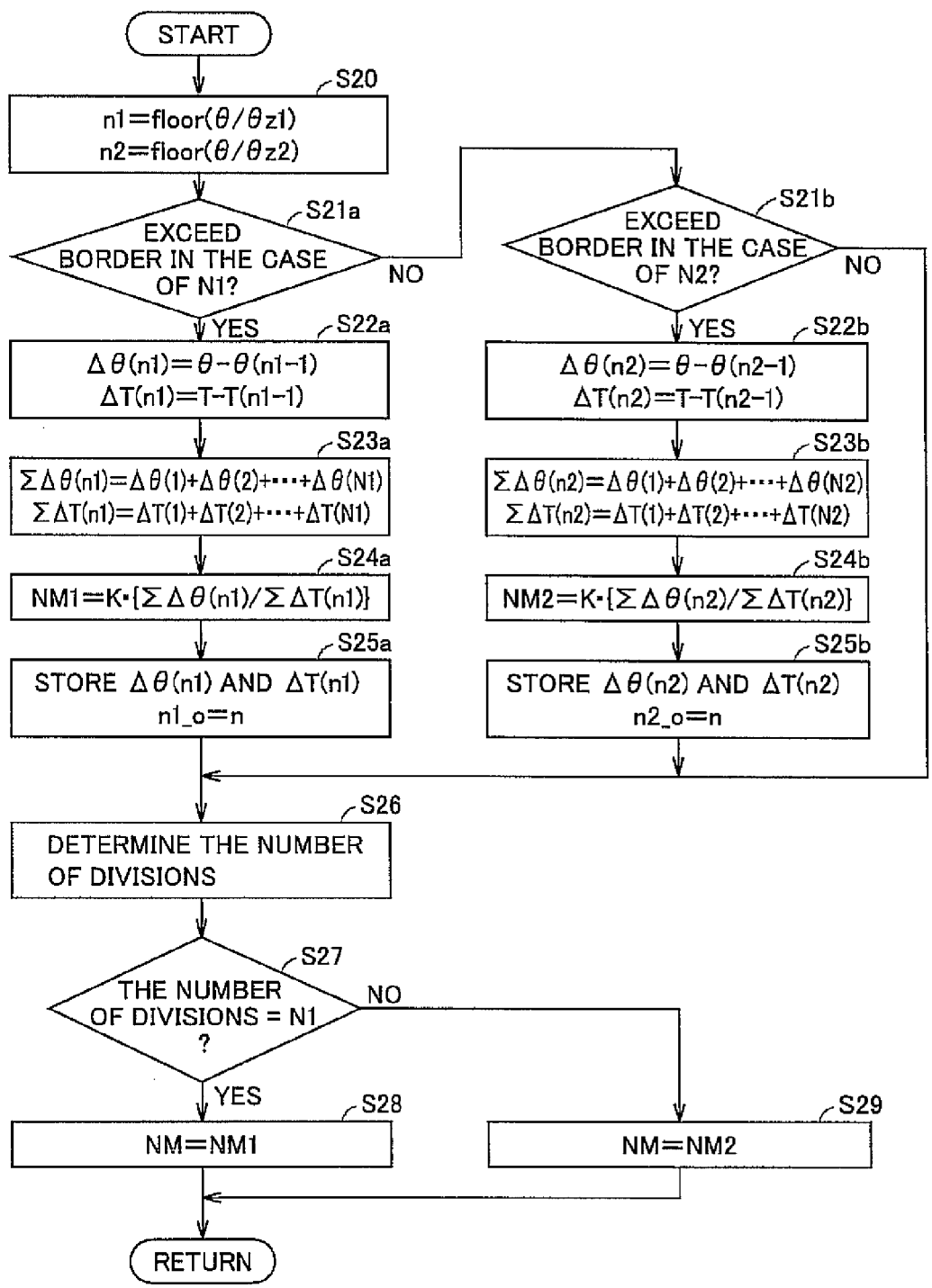
FIG. 7 is a (third) flow chart showing a procedure of the control device.

FIG. 7 is a flow chart showing a procedure of control device 30 in accordance with this variation. At S20, the control device 30 calculates a zone number n1 when the number of divisions N is set at a predetermined value N1 using the following Expression (1-1), and calculates a zone number n2 when the number of divisions N is set at a predetermined value N2 using the following Expression (1-2):

$$n1 = \text{floor}(\theta/\theta z1) \quad (1\text{-}1)$$

$$n2 = \text{floor}(\theta/\theta z2) \quad (1\text{-}2)$$

In Expressions (1-1) and (1-2), θz1=360/N1, and θz2=360/N2.

Predetermined values N1 and N2 will now be described. Predetermined values N1 and N2 are set at values at least satisfying the following Expression (5):

$$(\text{resolver cycle}/Tr) < N2 < N1 < (\text{resolver cycle} \times f) \quad (5)$$

In Expression (5), "Tr" is a value by which the memory overflows, and "resolver cycle/Tr" is the minimum value of the number of divisions N that can be prescribed for preventing the memory from overflowing. The number of calculations per unit time (in Hz) is denoted by "f", and "resolver cycle×f" is the maximum value of the number of divisions N that can be prescribed for correct calculation of rotation speed NM. That is, each of predetermined values N1 and N2 is set in advance at a value that prevents the memory from overflowing and that enables correct calculation of rotation speed NM.

It should be noted that, assuming that the multiplication factor of angle of the resolver is a, the number of pairs of poles of the motor is b, and the motor rotation speed is c (in rpm), the resolver cycle can be expressed as 60×a/(b×c). Therefore, the above Expression (5) can be transformed to the expression of {60×a/(b×c×Tr)}<N2<N1<{(60×a×f)/(b×c)}.

At S21a, control device 30 determines whether or not resolver angle θ exceeds a division border in the case where N=N1. When zone number n1 is changed from a zone number n1_o in the last calculation, control device 30 determines that resolver angle θ exceeds a division border in the case where N=N1.

When resolver angle θ exceeds a division border in the case where N=N1 (YES at S21a), control device 30 performs S22a to S25a similar to S12a to S14a shown in FIG. 5, respectively, with the number of divisions N set at N1, thereby calculating a rotation speed NM1 in the case where the number of divisions N=N1.

When resolver angle θ does not exceed a division border in the case where N=N1 (NO at S21), control device 30 performs S22b to S25b similar to S21a to S25a, respectively, with the number of divisions N set at N2, thereby calculating a rotation speed NM2 in the case where the number of divisions N=N2.

At S26, control device 30 determines whether the number of divisions N is to be set at predetermined value N1 or predetermined value N2 depending on the motor rotation speed (any one of rotation speed Nms, the average rotation speed of rotation speeds Nms, the rotation speed obtained by subjecting rotation speeds Nms to first-order lag processing, and rotation speed NM).

Herein, predetermined values N1 and N2 are set at values satisfying Expression (5), each being a value that can prevent the memory from overflowing and that enables correct calculation of rotation speed NM, as described above.

Figure 8:
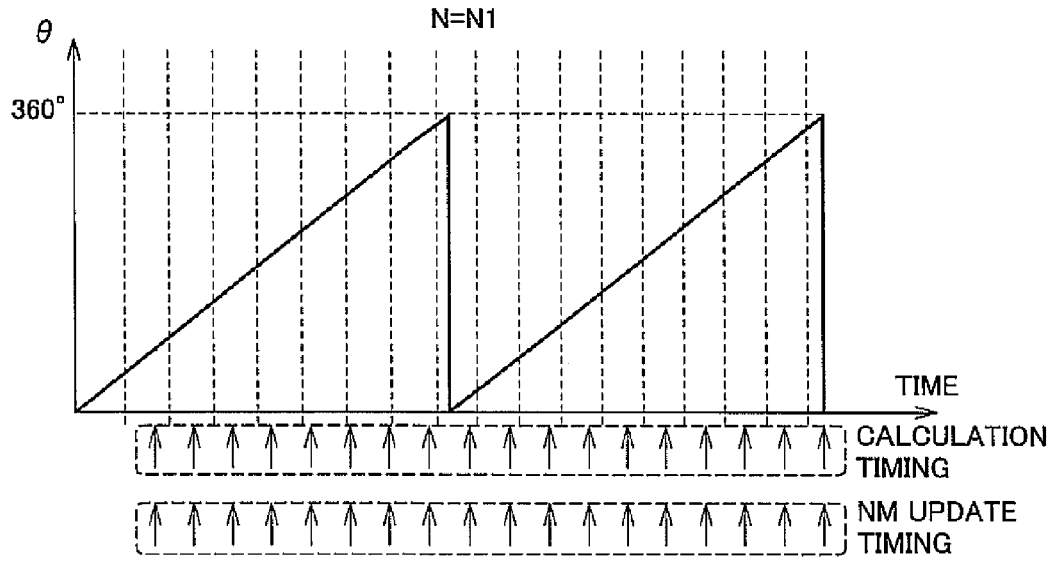
FIG. 8 is a diagram illustrating update timing of rotation speed NM when N=N1.
Figure 9:
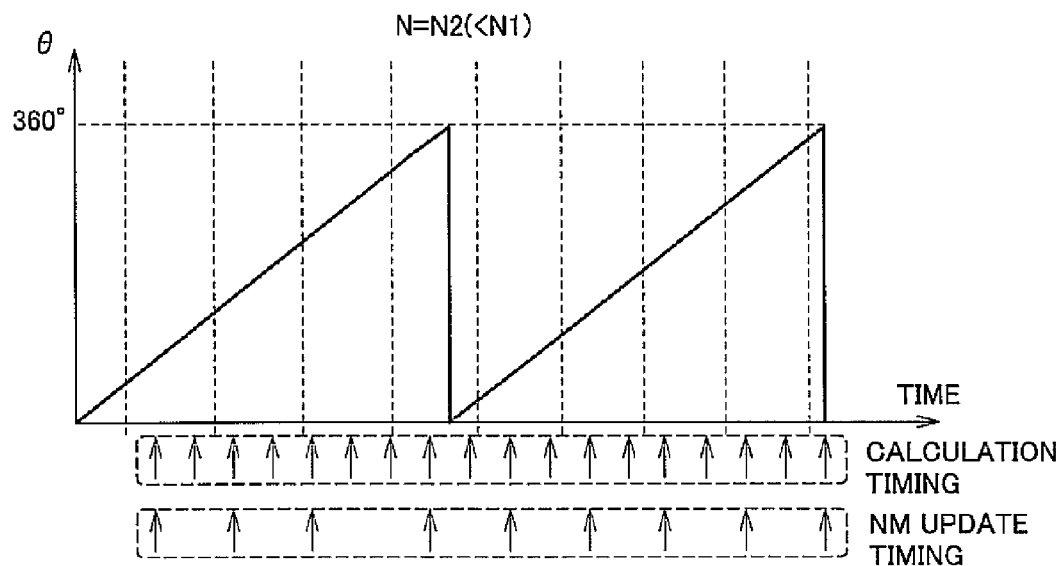
FIG. 9 is a diagram illustrating update timing of rotation speed NM when N=N2.

FIG. 8 is a diagram illustrating update timing of rotation speed NM in the case where N=N1. FIG. 9 is a diagram illustrating update timing of rotation speed NM in the case where N=N2 (<N1). As seen from FIGS. 8 and 9, the update timing (calculation cycle) of rotation speed NM can be made shorter in the case where the number of divisions N=N1 (FIG. 8) which is larger than N2, than in the case where the number of divisions N=N2 (FIG. 9).

Figure 10:
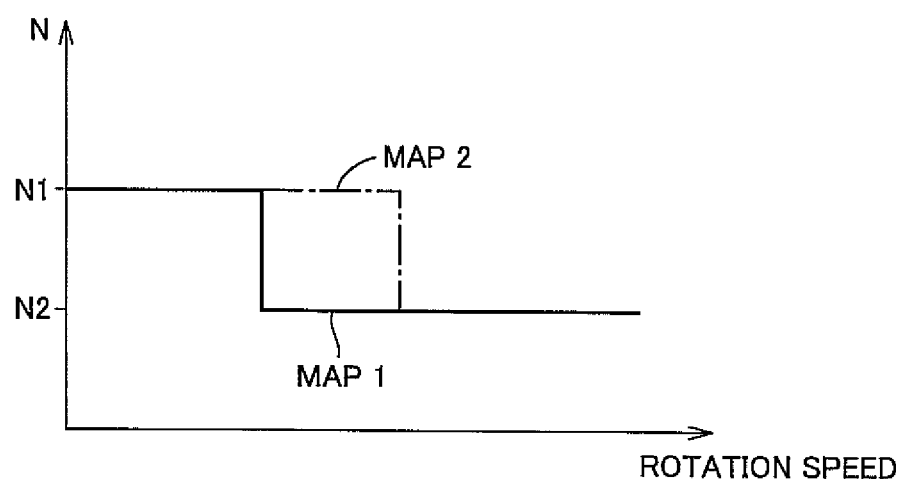
FIG. 10 is a map used for determining the number of divisions N.

FIG. 10 is a map used for determining the number of divisions N. Since rotation speed NM is updated every time resolver angle θ exceeds a division border, the update cycle of rotation speed NM is expressed as "resolver cycle/the number of divisions N." Since a resolver cycle is longer as the motor rotation speed is lower, the update cycle of rotation speed NM is also longer as the motor rotation speed is lower. Therefore, a response delay of rotation speed NM may be more likely to occur as the motor rotation speed is lower, which may result in degraded calculation accuracy of rotation speed NM. To deal with this problem, as shown in FIG. 10, control device 30 sets the number of divisions N at "N2" in an area where the motor rotation speed is higher than a predetermined speed, and at "N1", which is larger than N2, in an area where the motor rotation speed is lower than the predetermined speed.

It should be noted that, when the calculation cycle can be changed, the map may be changed per calculation cycle. For example, when the calculation cycle is 2.5 ms, a map 1 may be used to set the number of divisions N, and when the calculation cycle is shorter than 2.5 ms, a map 2 (alternate long and short dashed lines), in which an area where the number of divisions N is set at N1 is extended toward the higher speed side relative to map 1, may be used to set the number of divisions N.

Referring back to FIG. 7, control device 30 determines, at S27, whether or not the number of divisions N determined using the above-described maps shown in FIG. 10 is N1. When the number of divisions N is N1 (YES at S27), control device 30 sets rotation speed NM at rotation speed NM1 at S28. When the number of divisions N is N2 (NO at S27), control device 30 sets rotation speed NM at rotation speed NM2 at S29.

As described above, in this variation, the number of divisions N is changed from N2 to N1 larger than N2 in an area where the motor rotation speed is lower than a predetermined speed. This can minimize the response delay of rotation speed NM at low speeds as compared to the case where the number of divisions N is fixed to N2. Therefore, rotation speed NM can be calculated with accuracy even at low speeds.

Second Embodiment

The above first embodiment has described the technique of calculating rotation speed NM based on the resolver angle. In contrast, the second embodiment will describe a technique of predicting the motor rotation speed based on rotation speed NM.

Figure 11:
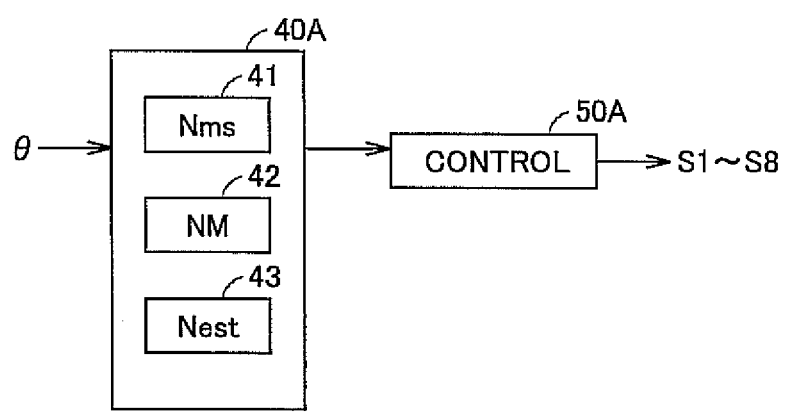
FIG. 11 is a (second) functional block diagram of the control device.

FIG. 11 is a functional block diagram of a control device 30A in accordance with the second embodiment. Control device 30A includes a calculation unit 40A and a control unit 50A. Calculation unit 40A includes a calculation unit 43 in addition to calculation units 41 and 42. The functions of calculation units 41 and 42 have been described above in the first embodiment, and detailed description thereof will not be repeated here.

Calculation unit 43 calculates a predicted rotation speed Nest of motor M1 at a future time point (hereinafter also referred to as a "predicted time point") succeeding the calculation time point of rotation speed NM, based on the history of rotation speed NM calculated by calculation unit 42.

Control unit 50A generates control signals S1 to S8 for bringing a rotation speed calculated by calculation unit 40A close to a target rotation speed, and outputs the signals to converter 12 and inverter 14. At this stage, control unit 50A determines which one of rotation speeds calculated by calculation unit 40A, such as rotation speeds Nms, NM, and Nest, is used to generate control signals S1 to S8 depending on the operation status and use of motor M1.

A technique of calculating predicted rotation speed Nest by calculation unit 43 will now be described in detail. To avoid delayed recognition of the rotation speed when the rotation speed suddenly changes, calculation unit 43 predicts the rotation speed at a predicted time point from the rate of change of rotation speed NM relative to rotation speed NM, thereby calculating predicted rotation speed Nest.

However, as described above, the update cycle of rotation speed NM is longer as the motor rotation speed is lower, so that rotation speed NM develops a response delay at low speeds. Therefore, predicted rotation speed Nest also develops a response delay at low speeds. In addition, it may be recognized as if the acceleration has changed suddenly even while the vehicle is being accelerated at a constant degree of acceleration from a low speed, which may cause predicted rotation speed Nest to be calculated excessively.

To deal with this problem, control device 30A predicts a more distant future as the motor rotation speed is lower, to thereby reduce the response delay of predicted rotation speed Nest at low speeds.

Figure 12:
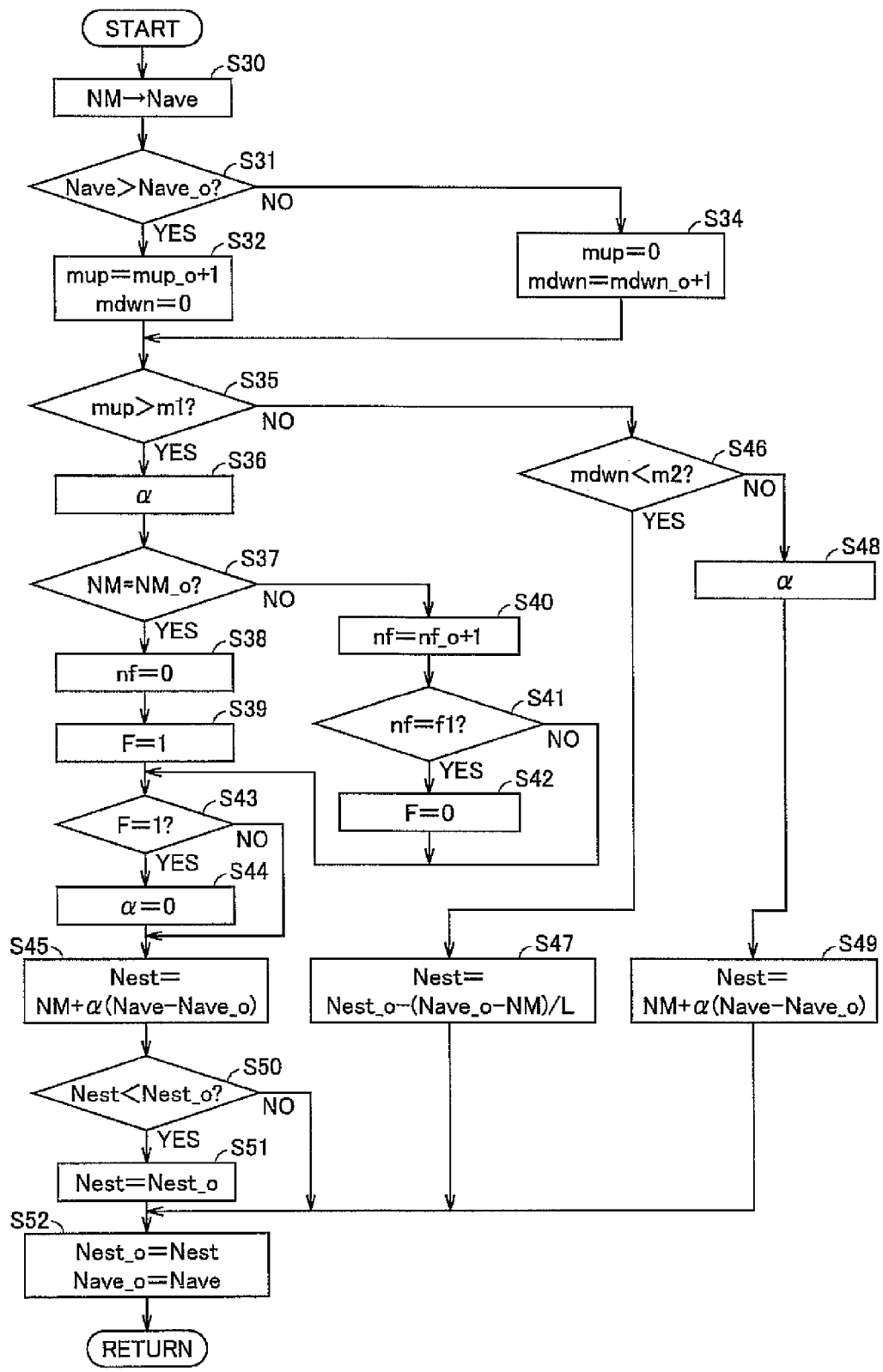
FIG. 12 is a (fourth) flow chart showing a procedure of the control device.

FIG. 12 is a flow chart showing a procedure of control device 30A when calculating predicted rotation speed Nest.

At S30, control device 30A calculates a moving average of a plurality of (e.g., four) rotation speeds NM in the past as an average rotation speed Nave.

At S31, control device 30A determines whether or not average rotation speed Nave in the current cycle is higher than an average rotation speed Nave_o in the preceding cycle. When Nave>Nave_o (YES at S31), control device 30A, at S32, increments an up-counter mup by 1 from a preceding value mup_o, and sets a down-counter mdwn at 0. When Nave<Nave_o (NO at S31), control device 30A, at S34, sets up-counter mup at 0, and increments down-counter mdwn by 1 from a preceding value mdwn_o.

At S35, control device 30A determines whether or not up-counter mup is larger than a threshold m1.

When mup>m1 (YES at S35), control device 30A calculates, at S36, a predicted cycle α based on a motor rotation speed (any one of rotation speed Nms, the average rotation speed of rotation speeds Nms, the rotation speed obtained by subjecting rotation speeds Nms to first-order lag processing, and rotation speed NM).

Figure 13:
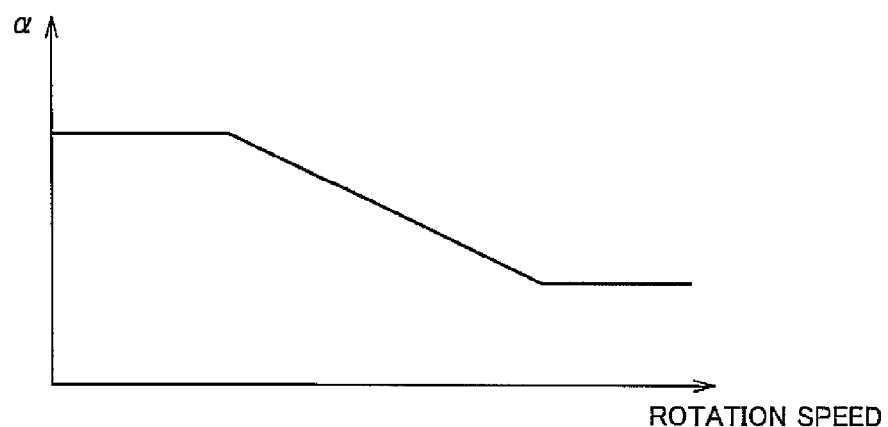
FIG. 13 is a map used for calculating a predicted cycle α.

FIG. 13 shows a map used for calculating predicted cycle α. As shown in FIG. 13, predicted cycle α is set at a larger value as the motor rotation speed is lower.

Referring back to FIG. 12, control device 30A determines, at S37, whether or not rotation speed NM has substantially an equal value to a preceding value NM_o.

When NM≈NM_o (YES at S37), control device 30A sets a prediction permitting counter nf at 0 at S38, and sets a prediction forbidding flag F at 1 at S39. Then, the process proceeds into S43.

When NM≈NM_o does not hold (NO at S37), control device 30A increments, at S40, prediction permitting counter nf by 1 from a preceding value nf_o, and determines, at S41, whether or not prediction permitting counter nf has reached an upper limit f1. When nf=f1 (YES at S41), control device 30A sets prediction forbidding flag F at 0 at S42, and advances the process to S43. When nf<f1 (NO at S41), control device 30A advances the process to S43.

At S43, control device 30A determines whether or not prediction forbidding flag F is at 1. When F=1 (YES at S43), control device 30A sets predicted cycle α at 0 at S44. Then, the process proceeds into S45. When F≠1 (NO at S43), control device 30A advances the process to S45.

At S45, control device 30A calculates predicted rotation speed Nest using the following Expression (6):

$$Nest = NM + \alpha \cdot (Nave - Nave\_o) \quad (6)$$

Herein, predicted cycle α is set at a larger (longer) value as the motor rotation speed is lower, as shown in the above-described FIG. 13. The time difference between a calculation time point of rotation speed NM and a predicted time point accordingly increases as the motor rotation speed is lower, allowing the rotation speed in a more distant future to be predicted. This can reduce the response delay of predicted rotation speed Nest at low speeds.

After calculation of predicted rotation speed Nest, control device 30A determines, at S50, whether or not predicted rotation speed Nest is lower than a preceding value Nest_o. When Nest<Nest_o (YES at S50), control device 30A maintains, at S51, predicted rotation speed Nest at preceding value Nest_o without update to a current value. Then, the process proceeds into S52.

When it is determined at S35 that mup<m1 (NO at S35), control device 30A determines, at S46, whether or not down-counter mdwn has a value smaller than a threshold m2. When mdwn>m2 (NO at S46), control device 30A performs, at S48, processing similar to S36 to calculate predicted cycle α in accordance with the motor rotation speed, and performs, at S49, processing similar to S45 to calculate predicted rotation speed Nest.

When mdwn<m2 (YES at S46), control device 30A calculates, at S47, predicted rotation speed Nest using the following Expression (7):

$$Nest = Nest\_o - (Nave\_o - NM)/L \qquad (7)$$

It should be noted that "L" represents the time difference between the calculation time of Nave_o and the calculation time of NM.

At S52, control device 30A stores, in the memory, predicted rotation speed Nest and average rotation speed Nave calculated in the current cycle as values Nest_o and Nave_o, respectively, for use in subsequent calculations.

As described above, in the present embodiment, predicted rotation speed Nest is calculated using rotation speed NM developing a response delay at low speeds, as shown in the above-mentioned Expression (6). Accordingly, predicted rotation speed Nest also develops a response delay at low speeds. Therefore, control device 30A sets predicted cycle α for use in calculation of predicted rotation speed Nest at a larger value as the motor rotation speed is lower, as shown in above-described FIG. 13. This allows a more distant future to be predicted as the motor rotation speed is lower, which can reduce the response delay of predicted rotation speed Nest at low speeds.

In the present embodiment, prediction of the rotation speed is forbidden when rotation speed NM is not changing.

Figure 14:
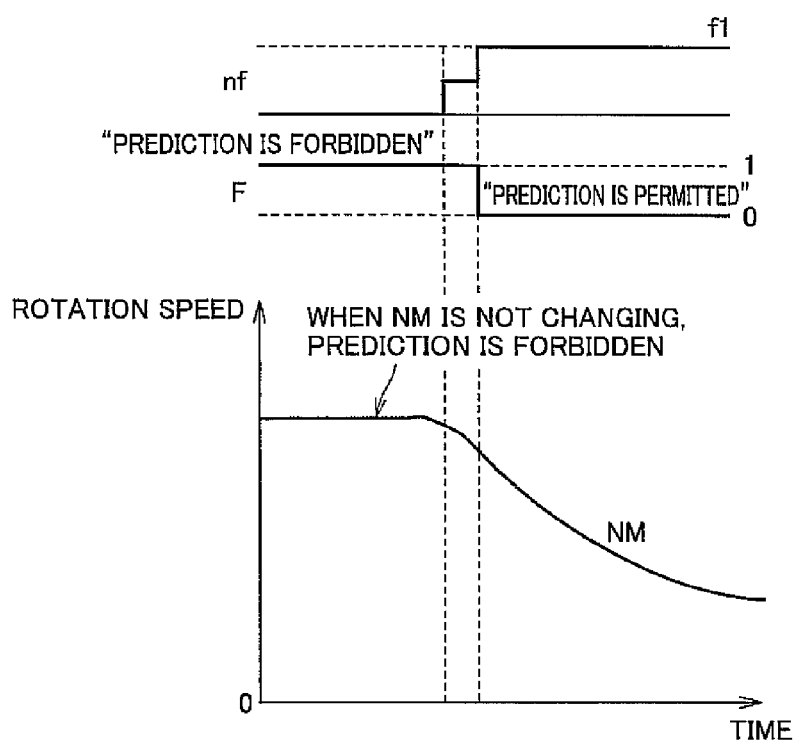
FIG. 14 is a diagram showing time variations of rotation speed NM, a prediction permitting counter nf, and a prediction forbidding flag F.

FIG. 14 is a diagram showing time variations of rotation speed NM, prediction permitting counter nf, and prediction forbidding flag F.

When rotation speed NM is not changing, prediction forbidding flag F is set at 1 as shown in FIG. 14. When prediction forbidding flag F is at 1, predicted cycle α is set at 0. Since the term "α·(Nave−Nave_o)" in the above-mentioned Expression (6) accordingly becomes 0, predicted rotation speed Nest is set at rotation speed NM itself. That is, prediction of the rotation speed is forbidden in the state where rotation speed NM is not changing and there is no need to consider a response delay.

When rotation speed NM is changing, prediction permitting counter nf is incremented, and prediction forbidding flag F is set at 0 at the time point when prediction permitting counter nf has reached upper limit f1. The term "α·(Nave−Nave_o)" in the above-mentioned Expression (6) accordingly functions, so that a value obtained by adding α·(Nave−Nave_o) to rotation speed NM is calculated as predicted rotation speed Nest.

As described above, in the present embodiment, permission and forbiddance of prediction of the rotation speed are switched depending on whether rotation speed NM is changing or not (whether it is necessary to consider a response delay), so that predicted rotation speed Nest can be calculated with higher accuracy.

First Variation of Second Embodiment

In the above-described second embodiment, predicted cycle α is changed to a larger value at low speeds, thereby reducing the response delay of predicted rotation speed Nest resulting from the response delay of rotation speed NM at low speeds.

In contrast, in this variation, the response delay of rotation speed NM itself at low speeds is reduced to thereby reduce the response delay of predicted rotation speed Nest.

Figure 15:
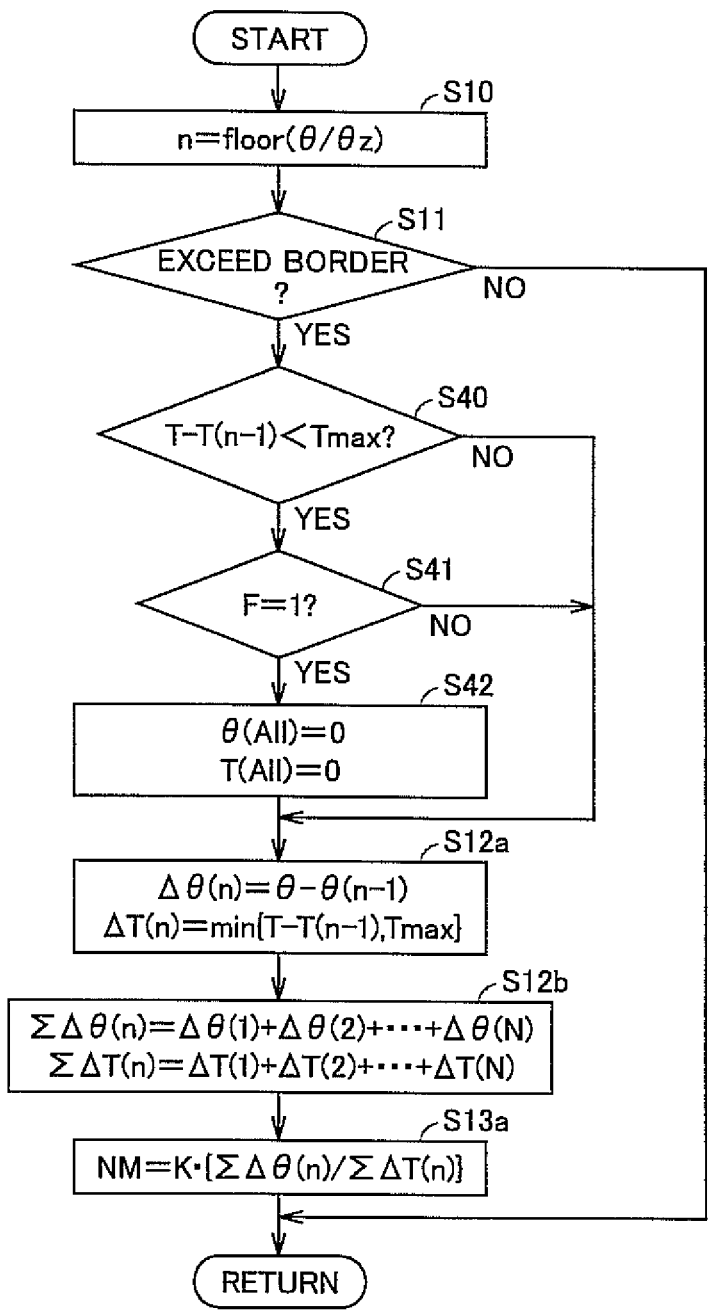
FIG. 15 is a (fifth) flow chart showing a procedure of the control device.

FIG. 15 is a flow chart showing a procedure when control device 30A in accordance with this variation calculates rotation speed NM. It should be noted that steps shown in FIG. 15 denoted by identical numbers as those shown in FIG. 5 have already been described, and detailed description thereof will thus not be repeated here.

At S40, control device 30A determines whether or not the difference between calculation time T(n−1) in the immediately preceding zone and calculation time T in the current cycle is shorter than upper limit time Tmax.

In this variation, upper limit time Tmax is set at a value obtained by dividing the resolver cycle when rotation speed NM is a lower limit rotation speed Nth by the number of divisions N. Since the angle corresponding to one resolver cycle is 360°, the relation shown in the following Expression (8) holds between lower limit rotation speed Nth and upper limit time Tmax:

$$Nth = K \cdot \{360/(N \cdot Tmax)\} \qquad (8)$$

When T−T(n−1)<Tmax (YES at S40), the process proceeds into S41. Otherwise (NO at S40), the process proceeds into S12a.

At S41, control device 30A determines whether or not prediction forbidding flag F is at 1. When F=1 (YES at S41), the process proceeds into S42. Otherwise (NO at S41), the process proceeds into S12a.

At S42, control device 30A updates all calculation times T (ALL) and resolver angles θ (All) in the preceding zones stored in the memory to 0.

Figure 16:
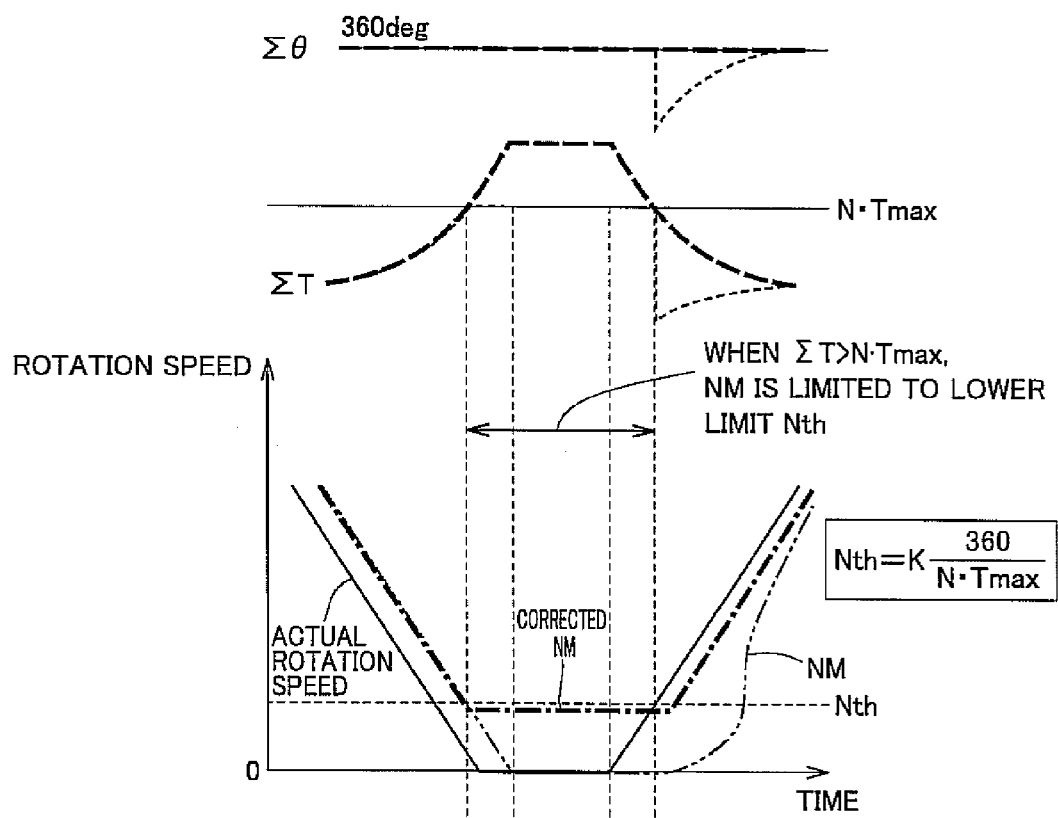
FIG. 16 is a diagram showing time variations of rotation speed NM.

FIG. 16 is a diagram showing time variations of rotation speed NM in this variation. In this variation, as shown in FIG. 16, when an actual rotation speed of motor M1 (solid line) falls below lower limit rotation speed Nth, rotation speed NM (alternate long and short dash line) is maintained at lower limit rotation speed Nth. This is because time difference ΔT used for calculating rotation speed NM is limited to upper limit time Tmax (a time period corresponding to lower limit rotation speed Nth) at S12a, rather than T−T(n−1), since T−T(n−1) exceeds upper limit time Tmax. This allows rotation speed NM to be maintained at lower limit rotation speed Nth when ΣΔT>N·Tmax.

When the actual rotation speed of motor M1 increases to exceed again lower limit rotation speed Nth, rotation speed NM is calculated based on resolver angle θ and calculation time T (division-border exceeding time) detected after the actual rotation speed has exceeded lower limit rotation speed Nth. This is because all calculation times T (ALL) and resolver angles θ (All) in the preceding zones stored in the memory are updated to 0 at S42 when T−T(n−1) falls below upper limit time Tmax (YES at S40). This reduces the response delay of rotation speed NM, which can avoid incorrect recognition as if the acceleration has changed suddenly even while the vehicle is being accelerated at a constant degree of acceleration from a low speed (cf. alternate long and two short dashes line). This can also prevent predicted rotation speed Nest from being calculated excessively.

Second Variation of Second Embodiment

In the above-described second embodiment, the rate of change (=Nave−Nave_o) in rotation speed used for calculating predicted rotation speed Nest in the above Expression (6) is calculated from the moving average of rotation speeds NM.

In contrast, in this variation, the rate of change in rotation speed used for calculating predicted rotation speed Nest is calculated from rotation speed Nms, rather than rotation speed NM.

Figure 17:
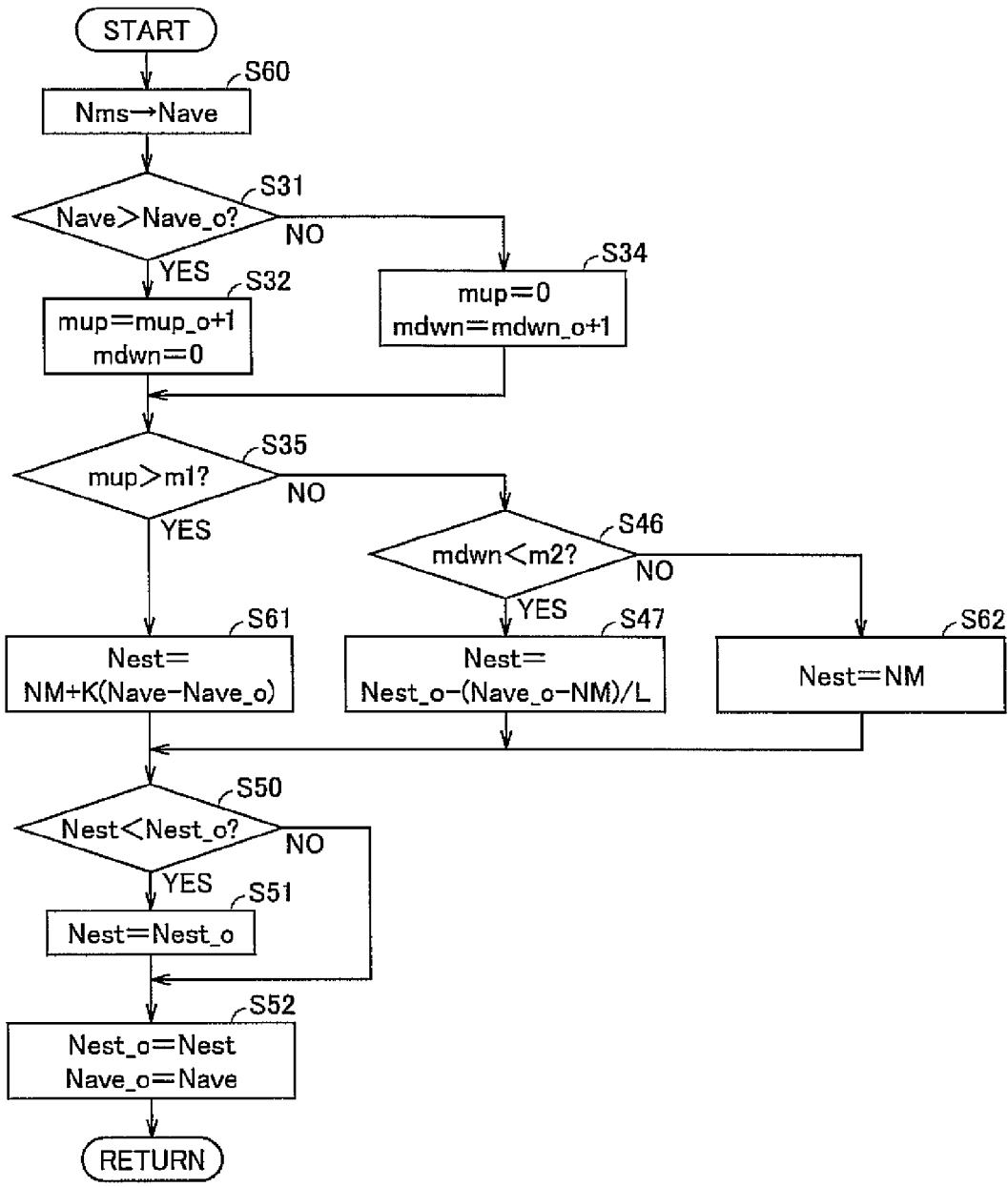
FIG. 17 is a (sixth) flow chart showing a procedure of the control device.

FIG. 17 is a flow chart showing a procedure of control device 30A in accordance with this variation. It should be noted that steps shown in FIG. 17 denoted by identical numbers as those shown in FIG. 12 have already been described, and detailed description thereof will thus not be repeated here.

At S60, control device 30A calculates the moving average of a plurality of past rotation speeds Nms, rather than the moving average of a plurality of past rotation speeds NM, as average rotation speed Nave.

When mup>m1 (YES at S35), control device 30A calculates, at S61, the rate of change in average rotation speed Nave (=Nave−Nave_o) obtained using rotation speed Nms, and calculates predicted rotation speed Nest using the calculated rate of change and the above-mentioned Expression (6).

When mdwn>m2 (NO at S46), control device 30A sets predicted rotation speed Nest at rotation speed NM at S62. That is, control device 30A does not perform prediction of the rotation speed.

As described above, in this variation, the rate of change in rotation speed used for calculating predicted rotation speed Nest is calculated using rotation speed Nms, which does not develop a response delay even at low speeds, rather than using rotation speed NM that may develop a response delay at low speeds. This can avoid a sudden change in predicted rotation speed Nest as described above, which can prevent predicted rotation speed Nest from being calculated excessively.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A control device for a motor, comprising:
   a resolver detecting a rotation angle of said motor; and
   a control unit controlling said motor based on an output of said resolver,
   said control unit
   dividing an angle corresponding to one cycle of the output of said resolver into a plurality of sections, and determining whether or not a detected angle of said resolver exceeds any border among said plurality of sections at each predetermined calculation cycle,
   calculating an angle variation from a first time point when border exceeding of said detected angle is determined to a second time point when said border exceeding is determined after one cycle,
   calculating a rotation speed of said motor based on a value obtained by dividing the angle variation from said first time point to said second time point by a time period between said first and second time points, and controlling said motor based on said rotation speed.

2. The control device in accordance with claim 1, wherein said control unit
   stores a time and said detected angle when said border exceeding is determined every time said border exceeding is determined,
   calculates the angle variation from said first time point to said second time point by adding a difference in said detected angle between said first and second time points to the angle corresponding to said one cycle, and
   calculates a time difference between said first and second time points as the time period between said first and second time points.

3. The control device in accordance with claim 2, wherein said control unit limits the time period between said first and second time points to a predetermined upper limit time.

4. The control device in accordance with claim 1, wherein said control unit
   every time said border exceeding is determined, stores a sectional time difference and a sectional angular difference in said detected angle between a time when said border exceeding is determined and a time when said border exceeding is determined in an immediately preceding section,
   calculates a total value of said sectional angular differences of said plurality of sections as the angle variation from said first time point to said second time point, and
   calculates a total value of said sectional time differences of said plurality of sections as the time period between said first and second time points.

5. The control device in accordance with claim 4, wherein said control unit limits the time period between said first and second time points to a predetermined upper limit time.

6. The control device in accordance with claim 1, wherein said control unit changes the number of divisions of the angle corresponding to said one cycle depending on said rotation speed.

7. The control device in accordance with claim 6, wherein said control unit increases said number of divisions as said rotation speed is lower.

8. The control device in accordance with claim 6, wherein, assuming that a multiplication factor of angle of said resolver is a, the number of pairs of poles of said motor is b, a speed of said motor per minute is c, the number of calculations per second is f, and a value at which a memory storing information for calculating said rotation speed overflows is Tr, said control unit changes said number of divisions in a range of values larger than 60×a/(b×c×Tr) and smaller than (60×a×f)/(b×c).

9. The control device in accordance with claim 1, wherein said control unit predicts said rotation speed at a third time point succeeding a time point when said rotation speed is calculated, based on a history of said rotation speed preceding the time point when said rotation speed is calculated.

10. The control device in accordance with claim 9, wherein, when predicting said rotation speed, said control unit extends a time difference between the time point when said rotation speed is calculated and said third time point as said rotation speed is lower.

11. A control method performed by a control device for a motor, a resolver detecting a rotation angle of said motor being connected to said control device,
    said control method comprising the steps of:
    dividing an angle corresponding to one cycle of the output of said resolver into a plurality of sections, and determining whether or not a detected angle of said resolver exceeds any border among said plurality of sections at each predetermined calculation cycle;
    calculating an angle variation from a first time point when border exceeding of said detected angle is determined to a second time point when said border exceeding is determined after one cycle;
    calculating a rotation speed of said motor based on a value obtained by dividing the angle variation from said first time point to said second time point by a time period between said first and second time points; and
    controlling said motor based on said rotation speed.

* * * * *